(12) United States Patent
Bearinger

(10) Patent No.: US 12,466,301 B2
(45) Date of Patent: Nov. 11, 2025

(54) HYDRAULIC CYLINDER ASSEMBLY FOR DUMP TRAILERS

(71) Applicant: BearClaw Equip Inc., Moorefield (CA)

(72) Inventor: Elwin Bearinger, Moorefield (CA)

(73) Assignee: BearClaw Equip Inc., Ontario (CA)

( * ) Notice: Subject to any disclaimer, the term of this patent is extended or adjusted under 35 U.S.C. 154(b) by 481 days.

(21) Appl. No.: 17/973,906

(22) Filed: Oct. 26, 2022

(65) Prior Publication Data
US 2023/0202372 A1 Jun. 29, 2023

Related U.S. Application Data

(60) Provisional application No. 63/293,698, filed on Dec. 24, 2021.

(51) Int. Cl.
| | |
|---|---|
| *B60P 1/00* | (2006.01) |
| *B60P 1/16* | (2006.01) |
| *B60P 1/28* | (2006.01) |
| *F15B 13/02* | (2006.01) |
| *F15B 15/14* | (2006.01) |

(52) U.S. Cl.
CPC ............ *B60P 1/162* (2013.01); *B60P 1/28* (2013.01); *F15B 13/024* (2013.01); *F15B 15/1409* (2013.01)

(58) Field of Classification Search
CPC ...... F15B 2211/7056; F15B 2211/8757; F15B 20/00; F15B 11/0365; F15B 15/1466; F15B 13/024; F15B 15/1409; F15B 15/1447; B60P 1/28; B60P 1/162
See application file for complete search history.

(56) References Cited

U.S. PATENT DOCUMENTS

| | | | | |
|---|---|---|---|---|
| 2,505,771 | A * | 5/1950 | Roger | F15B 11/036 |
| | | | | 91/533 |
| 2,956,549 | A * | 10/1960 | Malpass | F15B 11/0365 |
| | | | | 92/152 |
| 4,296,677 | A * | 10/1981 | Little | F15B 15/1466 |
| | | | | 92/108 |
| 6,817,067 | B2 * | 11/2004 | Kopp | F15B 11/17 |
| | | | | 91/519 |
| 2019/0055964 | A1 * | 2/2019 | Henderson | F03B 13/14 |
| 2022/0307230 | A1 * | 9/2022 | Haughom | E02F 9/0883 |
| 2023/0323902 | A1 * | 10/2023 | Ramanathan | F15B 15/20 |
| | | | | 414/469 |

* cited by examiner

*Primary Examiner* — Steven O Douglas
(74) *Attorney, Agent, or Firm* — Smart & Biggar LP

(57) ABSTRACT

A dump trailer and a hydraulic cylinder assembly for the dump trailer are described herein. The cylinder assembly includes a first barrel, a second barrel rigidly coupled to the first barrel along a longitudinal axis of the cylinder assembly, and a piston assembly. The first barrel includes an inlet port for receiving vehicle hydraulic fluid and an outlet port for providing the vehicle hydraulic fluid to the vehicle. The second barrel includes an inlet port and an outlet port for providing dump trailer hydraulic fluid to a hydraulic lifting mechanism of the dump trailer. The piston assembly includes a first piston and a second piston coupled to the first piston by a shaft. The piston assembly is configured to provide the dump trailer hydraulic fluid to the hydraulic lifting mechanism to lift a box of the dump trailer when the cylinder assembly receives hydraulic fluid from the vehicle.

20 Claims, 8 Drawing Sheets

HYDRAULIC CYLINDER ASSEMBLY FOR DUMP TRAILERS

CROSS-REFERENCE

The present application claims the benefit of U.S. Provisional Patent Application No. 63/293,698 entitled Hydraulic Cylinder Assembly for Dump Trailers files on Dec. 24, 2021, the entire contents of which are hereby incorporated by reference herein.

TECHNICAL FIELD

This disclosure relates generally to cylinder assemblies, and more specifically, to hydraulic cylinder assemblies for dump trailers.

BACKGROUND

Mobile work machines such as agricultural machines (e.g. tractors and/or harvesting machines) typically include hydraulic fluid circuits for operating various hydraulic implements on the machine. Often times, while operating these mobile work machine, it can be advantageous to attach a dump trailer to the machine to increase its capacity to transfer materials.

Dump trailers include a lifting mechanism that lifts a dump body relative to a frame of the trailer. In most dump trailers, the lifting mechanism is either electric or hydraulic. Hydraulic lift mechanisms typically offer a higher load capacity than electric lift mechanisms.

Hydraulic lift mechanisms typically either have a hydraulic system including a fluid storage reservoir and a hydraulic pump on board, or they are hydraulically coupled to the vehicle towing the dump trailer. In instances where the dump trailer includes a hydraulic system, the dump trailer typically has a lower load capacity than dump trailers that are hydraulically coupled to the vehicle because the sizing of the components of the hydraulic system (e.g. the volume of the reservoir and the capacity of the pump) on the trailer is smaller than the sizing of the components on the vehicle.

In instances where the dump trailer is hydraulically coupled to the vehicle, the dump trailer receives hydraulic fluid from the vehicle to lift the dump body of the trailer. In dump trailers with a high load capacity, this can result in a high volume of hydraulic fluid passing from the vehicle to the dump trailer, thereby reducing the performance of the hydraulic components of the vehicle.

Accordingly, there is a need for improved dump trailers that combine the benefits of existing dump trailers that are hydraulically coupled to vehicles and existing dump trailers that have independent hydraulic systems thereon.

SUMMARY

In accordance with a broad aspect, a hydraulic cylinder assembly for a dump trailer is described herein. The hydraulic cylinder assembly can be used with a vehicle having a vehicle hydraulic fluid system. The hydraulic cylinder assembly includes a first barrel defining a first chamber therein and a second barrel rigidly coupled to the first barrel along a longitudinal axis of the cylinder assembly. The second barrel defines a second chamber therein. The second chamber is separated from the first chamber by a barrier. The first barrel includes an inlet port remote from the barrier for receiving vehicle hydraulic fluid from the vehicle hydraulic fluid system into a fluid receiving portion of the first chamber. The first barrel also includes an outlet port adjacent the barrier for providing the vehicle hydraulic fluid from a fluid providing portion of the first chamber to the vehicle hydraulic fluid system. The second barrel includes an inlet port adjacent the barrier and an outlet port remote from the barrier for providing dump trailer hydraulic fluid to a hydraulic lifting mechanism of the dump trailer. The hydraulic cylinder assembly also includes a piston assembly. The piston assembly includes a first piston housed in the first chamber. The first piston divides the first chamber into the fluid receiving portion and the fluid providing portion. The piston assembly also includes a second piston housed in the second chamber. The second piston is coupled to the first piston by a shaft. The second piston divides the second chamber into the fluid receiving portion and the fluid providing portion. The shaft extends along the longitudinal axis through a bore in the barrier. The piston assembly is configured to provide the dump trailer hydraulic fluid to the hydraulic lifting mechanism to lift a dump box of the dump trailer when the fluid receiving portion of the first chamber receives the vehicle hydraulic fluid from the vehicle.

In at least one embodiment, the vehicle and the first chamber of the hydraulic cylinder assembly form a vehicle hydraulic fluid circuit and the hydraulic lifting mechanism and the second chamber of the hydraulic cylinder assembly form a trailer hydraulic fluid circuit.

In at least one embodiment, the barrier inhibits the vehicle hydraulic fluid of the vehicle hydraulic fluid circuit from entering the trailer hydraulic fluid circuit.

In at least one embodiment, the barrier includes a flange that extends radially outwardly relative to a sidewall of the first barrel and a sidewall of the second barrel.

In at least one embodiment, the flange of the barrier extends radially outwardly relative to the sidewall of the first barrel and the sidewall of the second barrel between a first flange of the first barrel and a second flange of the second barrel.

In at least one embodiment, the inlet port of the second barrel is configured to provide a compressible fluid into the fluid receiving portion of the second chamber when the fluid receiving portion of the first chamber receives the vehicle hydraulic fluid from the vehicle.

In at least one embodiment, the hydraulic cylinder assembly includes a pressure relief valve configured to redirect vehicle hydraulic fluid to the lifting mechanism when a pressure within the first chamber exceeds a threshold pressure.

In at least one embodiment, the first piston is configured to travel in a direction along the longitudinal axis of the hydraulic cylinder when the fluid receiving portion of the first chamber receives the vehicle hydraulic fluid from the vehicle.

In at least one embodiment, the second piston is configured to travel in a direction along the longitudinal axis of the hydraulic cylinder when the fluid receiving portion of the first chamber receives the vehicle hydraulic fluid from the vehicle.

In accordance with another broad aspect, a dump trailer is described herein. The dump trailer includes a frame, a dump box pivotally coupled to the frame and a hydraulic lifting mechanism coupled to each of the frame and the dump box. The hydraulic lifting mechanism is configured to lift a portion of the dump box relative to the frame. The dump trailer also includes a hydraulic cylinder assembly hydraulically coupled to the hydraulic lifting mechanism and a vehicle hydraulic system of a vehicle. The hydraulic cylinder assembly includes a first barrel defining a first chamber therein and a second barrel rigidly coupled to the first barrel along a longitudinal axis of the cylinder assembly. The second barrel defines a second chamber therein. The second chamber is separated from the first chamber by a barrier. The first barrel includes an inlet port remote from the barrier for receiving vehicle hydraulic fluid from the vehicle hydraulic fluid system into a fluid receiving portion of the first chamber. The first barrel also includes an outlet port adjacent the barrier for providing the vehicle hydraulic fluid from a fluid providing portion of the first chamber to the vehicle hydraulic fluid system. The second barrel includes an inlet port adjacent the barrier and an outlet port remote from the barrier for providing dump trailer hydraulic fluid to a hydraulic lifting mechanism of the dump trailer. The hydraulic cylinder assembly also includes a piston assembly. The piston assembly includes a first piston housed in the first chamber. The first piston divides the first chamber into the fluid receiving portion and the fluid providing portion. The piston assembly also includes a second piston housed in the second chamber. The second piston is coupled to the first piston by a shaft. The second piston divides the second chamber into the fluid receiving portion and the fluid providing portion. The shaft extends along the longitudinal axis through a bore in the barrier. The piston assembly is configured to provide the dump trailer hydraulic fluid to the hydraulic lifting mechanism to lift a dump box of the dump trailer when the fluid receiving portion of the first chamber receives the vehicle hydraulic fluid from the vehicle.

In at least one embodiment, the hydraulic cylinder assembly includes a first hydraulic cylinder and a second hydraulic cylinder, each of the first hydraulic cylinder and the second hydraulic cylinder being hydraulically coupled to the vehicle hydraulic system.

In at least one embodiment, the hydraulic cylinder assembly includes a pressure relief valve hydraulically coupled to each of the first hydraulic cylinder and the second hydraulic cylinder, the pressure relief valve being configured to redirect the vehicle hydraulic fluid to the lifting mechanism when a pressure within a first chamber of the first hydraulic cylinder or a first chamber of the second hydraulic cylinder exceeds a threshold pressure.

In accordance with another broad aspect, a method of operating a dump trailer is described herein. The method includes hydraulically coupling a vehicle hydraulic system to a hydraulic cylinder assembly of the dump trailer. The hydraulic cylinder assembly is hydraulically coupled to a lifting mechanism of the dump trailer. The hydraulic cylinder assembly includes at least one hydraulic cylinder. The at least one hydraulic cylinder includes a first barrel defining a first chamber therein and a second barrel rigidly coupled to the first barrel along a longitudinal axis of the cylinder assembly. The second barrel defines a second chamber therein. The second chamber is separated from the first chamber by a barrier. The method also includes injecting vehicle hydraulic fluid from the vehicle hydraulic fluid system into a fluid receiving portion of the first chamber of the first barrel to drive a first piston housed in the first chamber and a second piston housed in the second chamber. The second piston is configured to inject trailer hydraulic fluid housed in the second barrel into a lifting mechanism to lift a dump body of the dump trailer. The method also includes injecting vehicle hydraulic fluid into a fluid providing portion of the first chamber of the first barrel of the hydraulic cylinder assembly to draw trailer hydraulic fluid out of the lifting mechanism and into the second barrel to lower the dump body of the dump trailer.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
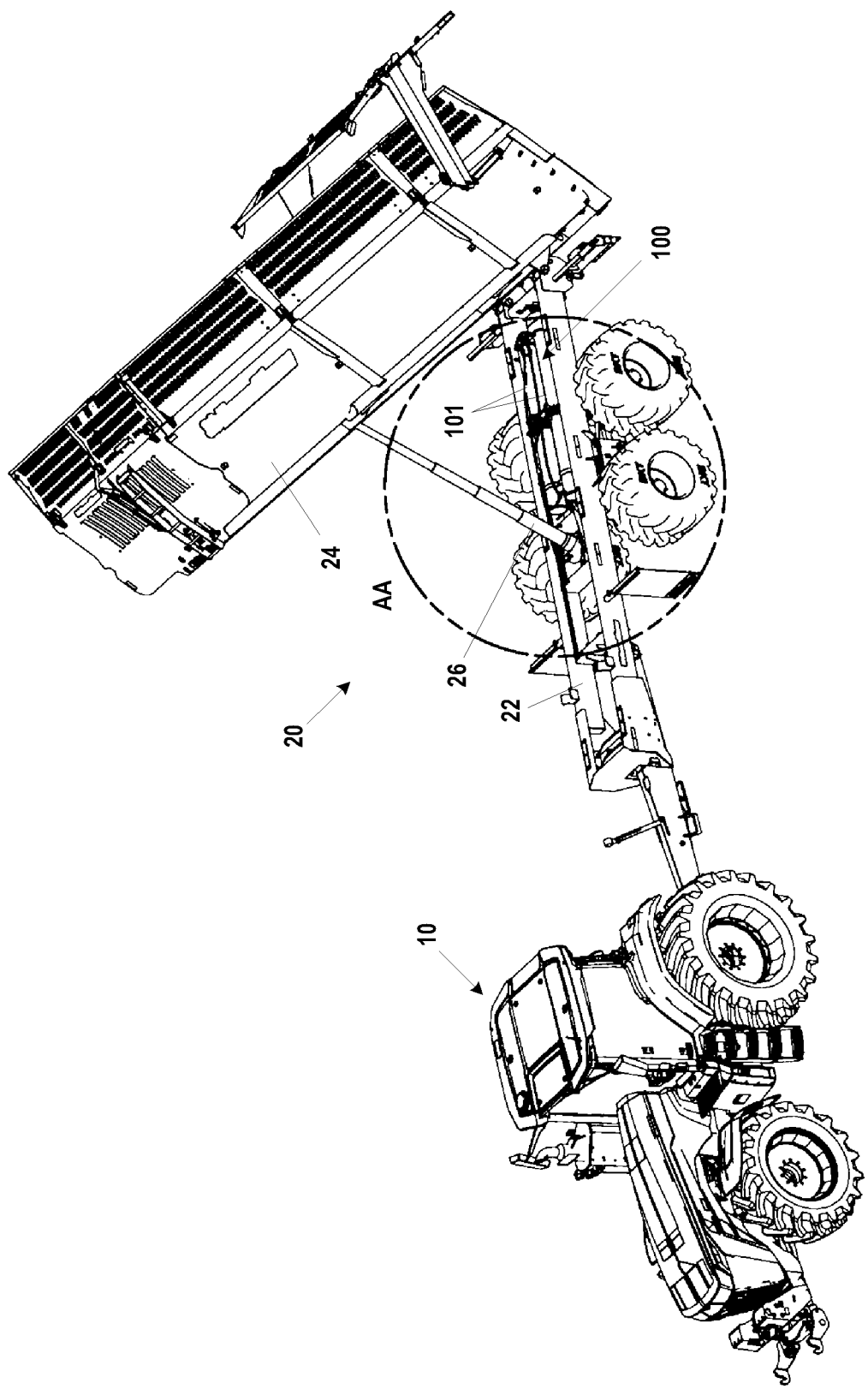
FIG. 1 is a perspective view of a dump trailer having a double barrel cylinder assembly according to at least one embodiment described herein connected to a tractor.

Further aspects and features of the example embodiments described herein will appear from the following description taken together with the accompanying drawings.

DETAILED DESCRIPTION

Various apparatuses, methods and compositions are described below to provide an example of at least one embodiment of the claimed subject matter. No embodiment described below limits any claimed subject matter and any claimed subject matter may cover apparatuses and methods that differ from those described below. The claimed subject matter are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed subject matter. Any subject matter that is disclosed in an apparatus, method or composition described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive-or. That is, "X and/or Y" is intended to mean X, Y or X and Y, for example. As a further example, "X, Y, and/or Z" is intended to mean X or Y or Z or any combination thereof. Also, the expression of A, B and C means various combinations including A; B; C; A and B; A and C; B and C; or A, B and C.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Herein, the term "hydraulic fluid" is used to refer to a non-compressible fluid that is commonly used in hydraulic systems of machinery, such as but not limited to a low viscosity fluid like oil.

Herein, the term "hydraulically coupled" is used to refer to coupling two elements in a manner so that the elements share a hydraulic fluid.

Turning to the figures, FIG. 1 shows a perspective view of a dump trailer 20 coupled to a vehicle 10.

Vehicle 10 can be any motorized vehicle with an on-board hydraulic fluid system capable of coupling to cylinder assembly 100 of dump trailer 20. Vehicle 10 may include but is not limited to mobile work machines, for example, agricultural machines, such as tractors or harvesting machines. Vehicle 10 may also include construction and forestry machines, for example. In the embodiment shown in FIG. 1, vehicle 10 is a tractor. Vehicle 10 and dump trailer 20 are hydraulically coupled to each other such that hydraulic fluid present in the vehicle 10 is transferred to the dump trailer 20 (and specifically to cylinder assembly 100).

Dump trailer 20 includes a frame 22 and a dump body 24 pivotally coupled to the frame 22. Dump trailer 20 also includes a lifting mechanism 26 configured to lift at least a portion of dump body 24 relative to frame 22. In FIG. 1, dump body 24 is shown in a lifted position. Lifting mechanism 26 is shown as a single telescoping hydraulic cylinder that has extended to lift a front portion of dump body 24 relative to frame 22, however, lifting mechanism 26 may have other configurations, such as but not limited to being dual telescoping hydraulic cylinders or a scissor hoist.

Dump trailer 20 also includes a hydraulic cylinder assembly 100. In the embodiment shown in FIG. 1, hydraulic cylinder assembly 100 includes two hydraulic cylinders 101 fluidly coupled to operate in parallel with each other, however, hydraulic cylinder assembly 100 may include a single hydraulic cylinder 101 or, alternatively, may include two or more hydraulic cylinders 101 operating in parallel with each other.

Hydraulic cylinder assembly 100 may be included with dump trailer 20 when it is manufactured or may be added to dump trailer 20 as an aftermarket improvement. In at least one embodiment, hydraulic cylinder assembly 100 may be added to a dump trailer 20 having a telescoping cylinder 26, or, alternatively, any other form of hydraulic lifting mechanism 26, to facilitate coupling dump trailer 20 to vehicle 10.

Figure 2:
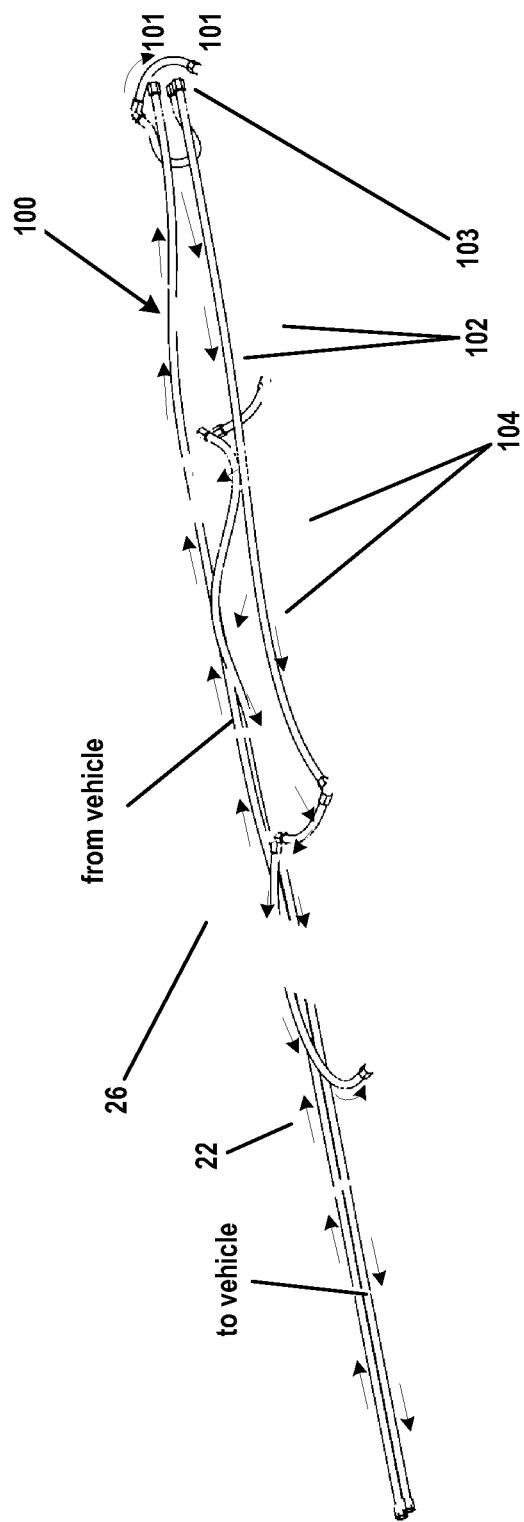
FIG. 2 is a perspective view of the magnified portion AA of the dump trailer shown in FIG. 1.

FIG. 2 shows a perspective view of the magnified portion AA identified in FIG. 1. The arrows present in FIG. 2 show the flow of hydraulic fluid from the vehicle hydraulic system to hydraulic cylinder assembly 100, the flow of hydraulic fluid from hydraulic cylinder assembly 100 to lifting mechanism 26 and the flow of hydraulic fluid from hydraulic cylinder assembly 100 back to the vehicle hydraulic system.

Hydraulic cylinder assembly 100 is configured, as described below, to store hydraulic fluid therein to be used to lift at least a portion of dump body 24 relative to frame 22. Herein, hydraulic fluid stored on the dump trailer 20, either in hydraulic cylinder assembly 100, lifting mechanism 26 or a hydraulic fluid reservoir (not shown), prior to lifting the dump body 24 is referred to as "dump trailer hydraulic fluid". As described below, dump trailer hydraulic fluid passes hydraulic cylinder assembly 100 and the lifting mechanism 26.

Conversely, hydraulic fluid that passes between the vehicle hydraulic system and hydraulic fluid assembly 100 is referred to herein as "vehicle hydraulic fluid".

In at least one embodiment, to lift dump box 24 of dump trailer 20, vehicle hydraulic fluid passes through a first fluid circuit from the vehicle hydraulic system into first barrel 102 of each hydraulic cylinder 101 of hydraulic fluid assembly 100. As vehicle hydraulic fluid passes through the first circuit, dump trailer hydraulic fluid passes through a second circuit from second barrel 104 of each hydraulic cylinder 101 to lifting mechanism 26.

In at least one embodiment, vehicle hydraulic fluid may pass from the first circuit to the second circuit through a pressure relief valve 103. Pressure relief valve 103 is shown in FIG. 2. Pressure relief valve 103 is a controllable valve that can be, for example, set to be activated upon the pressure in first barrel 102 of hydraulic cylinder 101 exceeding a threshold pressure. If the pressure in the first barrel 102 exceeds the threshold pressure when first barrel 102 is being filled (i.e., when lifting mechanism 26 is lifting dump body 24 relative to frame 22), pressure relief valve 103 may be activated and vehicle hydraulic fluid may be redirected directly to either second barrel 104 or lifting mechanism 26 to expedite lifting dump body 24 relative to frame 22.

In at least one embodiment, vehicle hydraulic fluid may be directed from the first circuit to the second circuit through a pressure relief valve 103 when first using the hydraulic cylinder assembly 100. For example, in at least one embodiment, pressure relief valve 103 may be opened and vehicle hydraulic fluid may be directed directly into second barrel 104 to fill second barrel 104 prior to using the hydraulic cylinder assembly 100. Once second barrel 104 (i.e., second chamber 120) is filled with vehicle hydraulic fluid, pressure relief valve 103 may be closed and operation of the hydraulic cylinder assembly 100 may proceed as described below.

Figure 3:
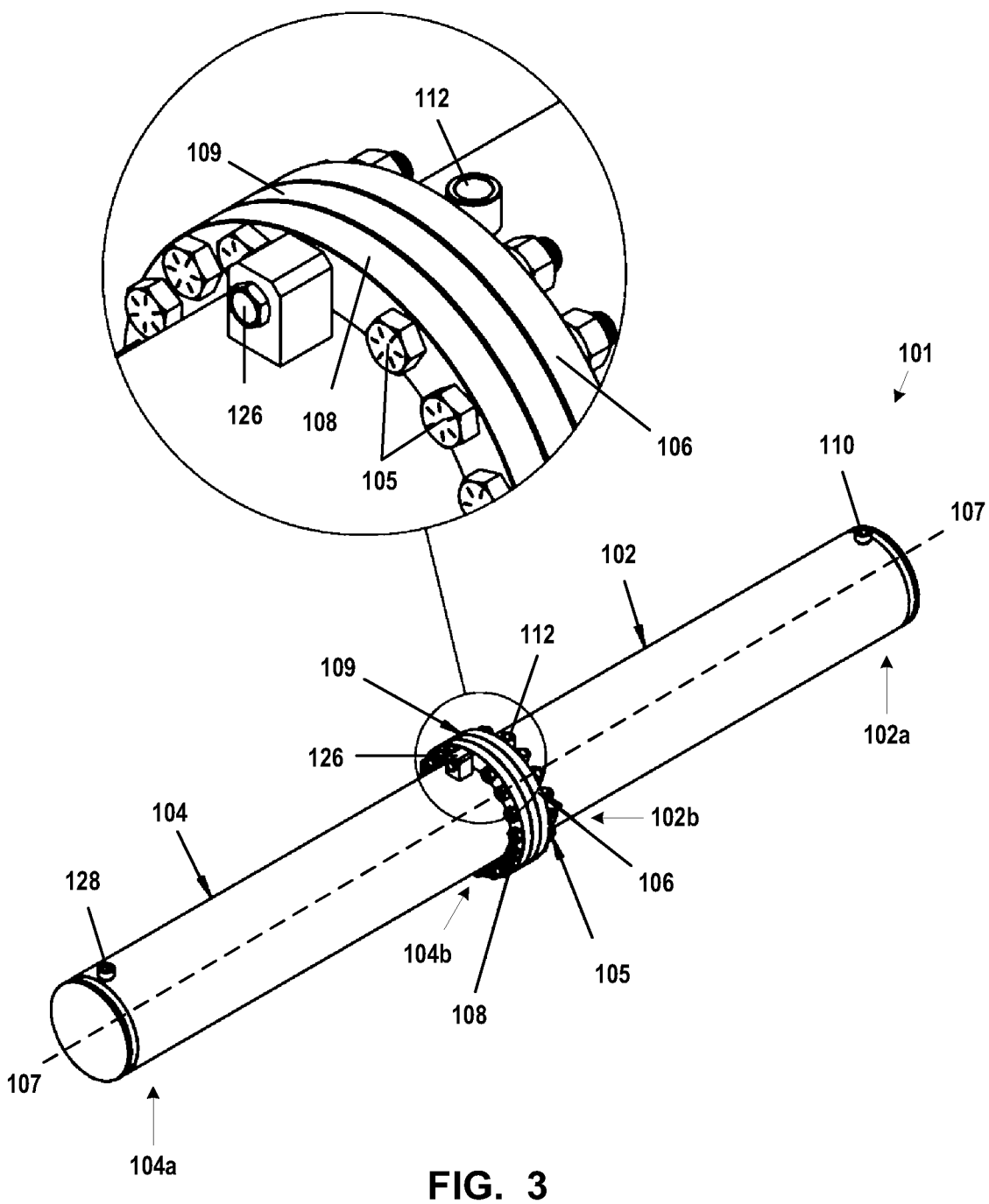
FIG. 3 is a perspective view of a double barrel cylinder assembly according to at least one embodiment described herein.

Turning to FIG. 3, a perspective view of a hydraulic cylinder 101 of cylinder assembly 100 is shown therein. As noted above, cylinder assembly 100 may include one or more hydraulic cylinders 101.

Hydraulic cylinder 101 may be referred to as a double barrel hydraulic cylinder as it comprises a first barrel 102 rigidly coupled to a second barrel 104 along a longitudinal axis 107 of the cylinder 101. First barrel 102 and second barrel 104 are coupled end-to-end along longitudinal axis 107. First barrel 102 and second barrel 104 are sealingly coupled to one another so hydraulic fluid from first barrel 102 does not leak into second barrel 104 (e.g. through a bore of barrier 109, described in greater detail below).

As shown in FIG. 3, first barrel 102 has a first end 102a and a second end 102b spaced apart from first end 102a. First barrel 102 is longitudinally coupled to second barrel 104 by a first flange 106. First flange 106 is positioned at second end 102b of barrel 102. Similarly, second barrel 104 has a first end 104a and a second end 104b spaced apart from first end 104a. Second barrel 104 includes a second flange 108 for coupling to first barrel 102. Second flange 108 is positioned at second end 104b of second barrel 104. Each of first flange 106 and second flange 108 is configured to receive a plurality of fasteners 105 (e.g. bolts and nuts, screws, etc.) for coupling first barrel 102 and second barrel 104. For example, first flange 106 and second flange 108 may each include a plurality of holes configured to receive at least one of the plurality of fasteners 105. It should be understood that first barrel 102 and second barrel 104 may be coupled in any manner known to a person skilled in the art.

Hydraulic cylinder 101 also includes a barrier 109 having a flange 111 that extends radially outwardly relative to hydraulic cylinder 101 between first flange 106 of first barrel 102 and second flange 108 of second barrel 104. Barrier 109 divides the first chamber of first barrel 102 and the second chamber of second barrel 104 (as described in greater detail below). In at least one embodiment, flange 111 may be configured to receive fasteners 105 used to couple first barrel 102 and second barrel 104 to secure the barrier 109 to first barrel 102 and second barrel 104.

Figure 4:
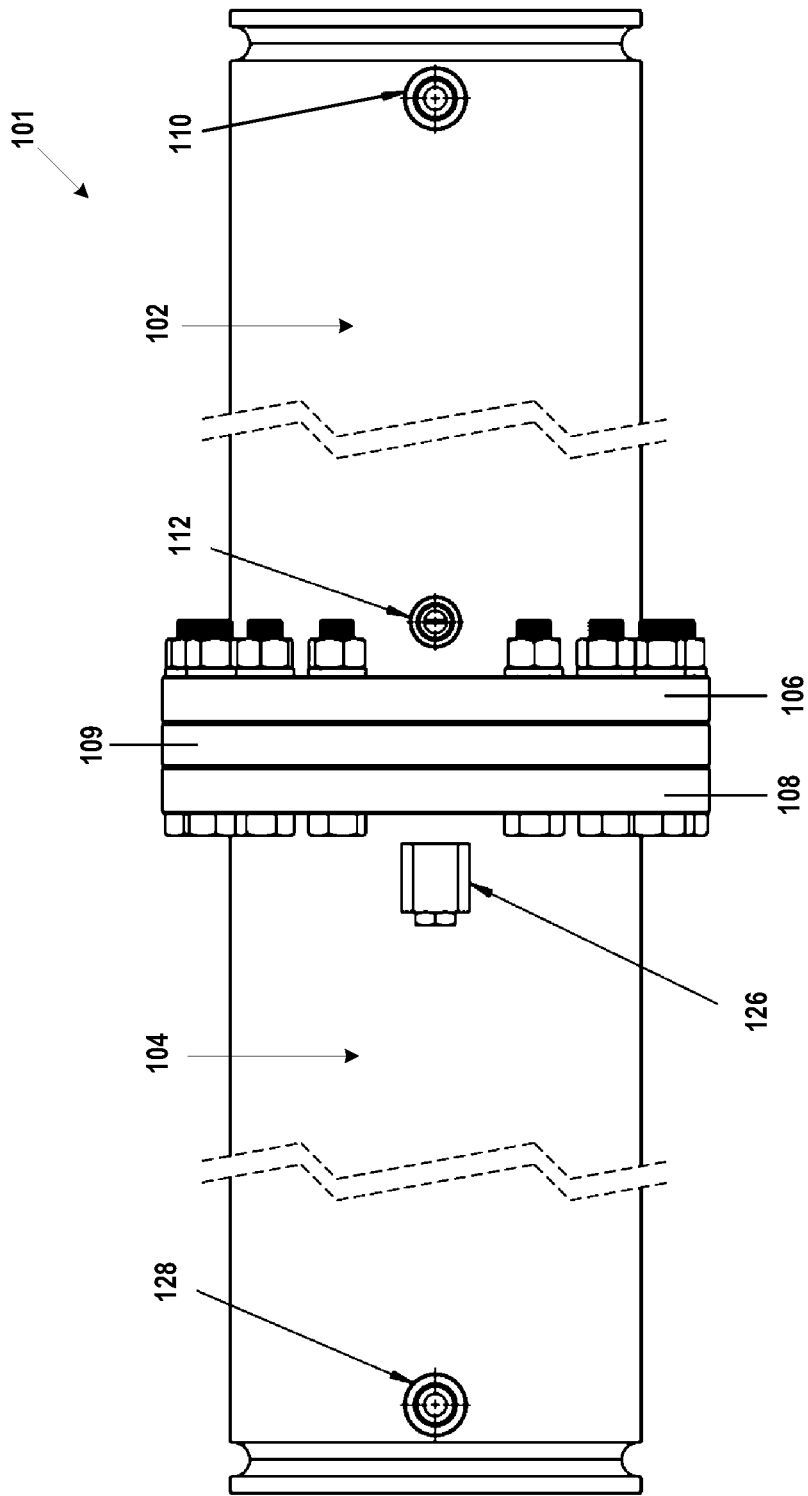
FIG. 4 is a top down view of the double barrel cylinder assembly shown in FIG. 3.
Figure 5:
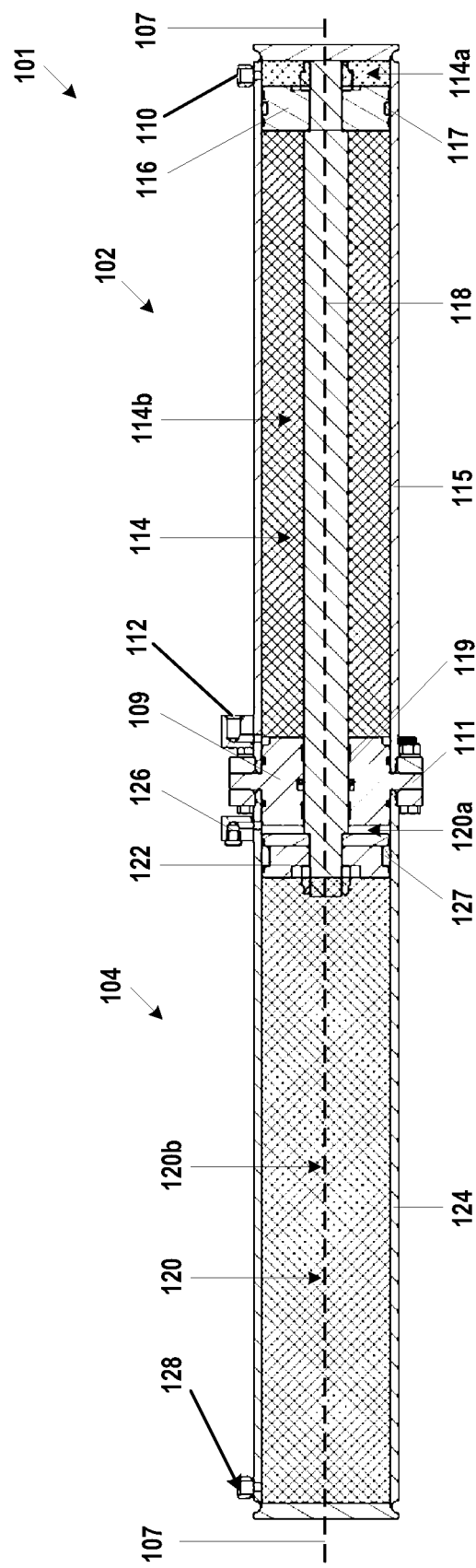
FIG. 5 is a cross-sectional view of the double barrel cylinder assembly shown in FIGS. 3 and 4 when the dump box is lowered.
Figure 6:
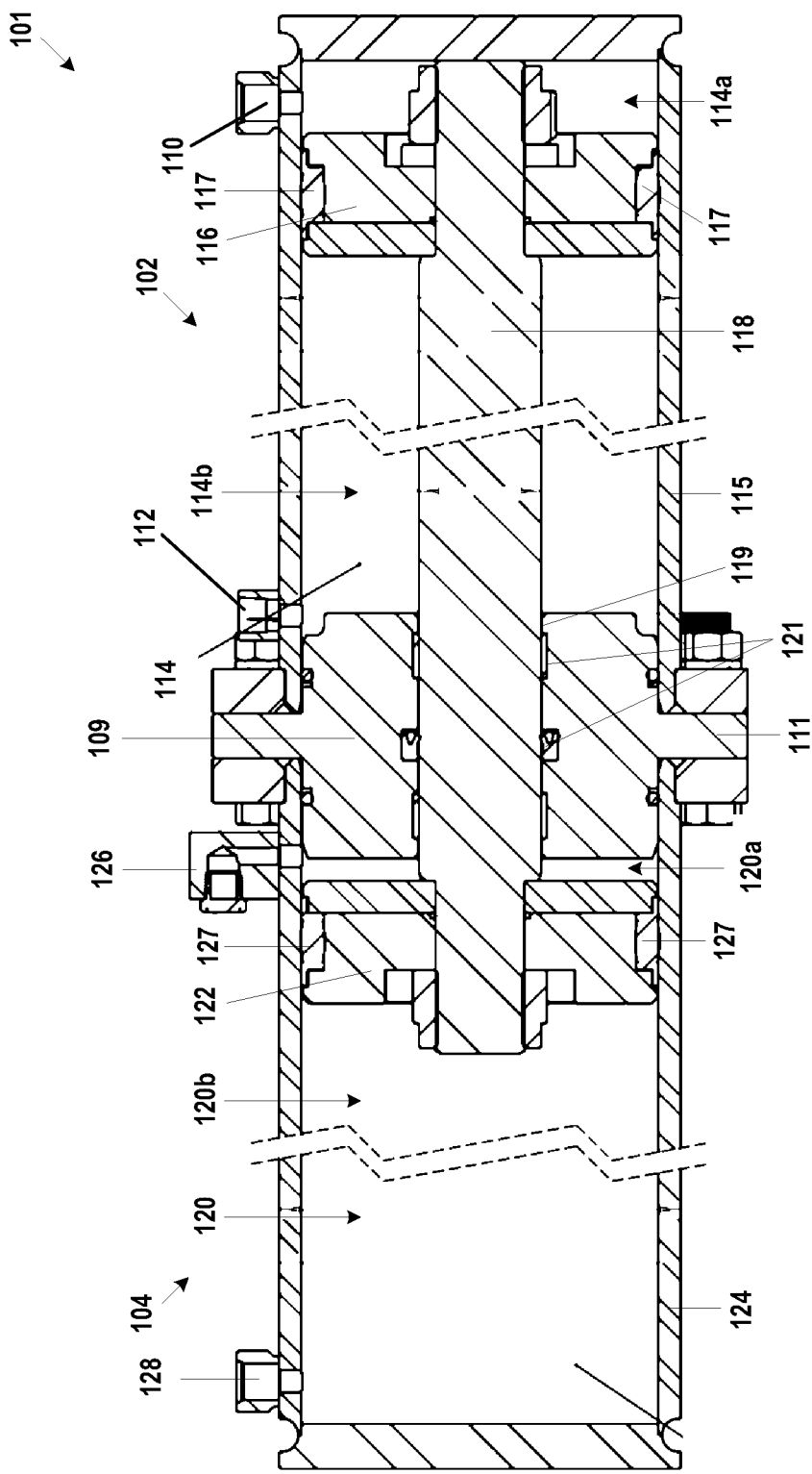
FIG. 6 is another cross-sectional view of the double barrel cylinder assembly shown in FIGS. 3 and 4 where a barrier between the barrels of the cylinder assembly has been magnified.

First barrel has an inlet port 110 remote from the barrier 109 and an outlet port 112 adjacent the barrier 109, each being shown in FIGS. 3 and 4. Inlet port 110 is configured to receive vehicle hydraulic fluid from a vehicle hydraulic system and direct the vehicle hydraulic fluid into first chamber 114 of hydraulic cylinder 101. First chamber 114 is shown in FIGS. 5 and 6. First chamber 114 houses a first piston 116 that divides first chamber 114 into a fluid receiving portion 114a and a fluid providing portion 114b. Accordingly, the vehicle hydraulic fluid is received from the vehicle hydraulic system in fluid receiving portion 114a when an operator of the tractor desires to the lift dump box 24.

First chamber 114 and second chamber 120 may have any volume that is appropriate for operating the vehicle and for lifting the dump box 24. For example, in at least one embodiment, fluid receiving portion 114a and/or fluid receiving portion 120a may hold a volume of fluid (e.g. vehicle hydraulic fluid or air, respectively) in a range of about 10 L to about 50 L, or in a range of about 20 L to about 40 L, or in a range of about 27 L to about 32 L, or of about 27 L or of about 32 L when dump box 24 is lifted. For example, in at least one embodiment, fluid providing portion 114b and or fluid providing portion 120b may hold a volume of fluid (e.g. vehicle hydraulic fluid or trailer hydraulic fluid, respectively) in a range of about 10 L to about 50 L, or in a range of about 20 L to about 40 L, or in a range of about 27 L to about 32 L, or of about 27 L or of about 32 L when dump box 24 is lowered.

Piston 116 sealingly engages a sidewall 115 of first barrel 102 to inhibit the passage of vehicle hydraulic fluid between fluid receiving portion 114a and fluid providing portion 114b. To sealingly engage sidewall 115, piston 116 may include one or more gaskets or seals 117. Gaskets or seals 117 may also promote sealed sliding movement of piston 116 within first chamber 114.

Piston 116 is coupled to a shaft 118 that generally extends through a center portion of chamber 114. When vehicle hydraulic fluid is provided to receiving portion 114a, piston 116 is driven to move in a direction along longitudinal axis 107. In the embodiment shown in the drawings, shaft 118 has a longitudinal axis that is co-axial with the longitudinal axis 107 of cylinder 101.

As shown in FIGS. 5 and 6, shaft 118 passes through barrier 109 separating first chamber 114 and second chamber 120. In at least one embodiment, barrier 109 has a central bore 119 that enables shaft 118 to pass therethrough. Shaft 118 sealingly engages barrier 109 I bore 119 to ensure that vehicle hydraulic fluid present in fluid providing portion 114b does not enter fluid receiving portion 120a of second chamber 120 and to ensure that compressible fluid (e.g. air) present in fluid receiving portion 120a does not pass to fluid providing portion 114b. Accordingly, barrier 109 may include gaskets or seals 121, for example around a perimeter of bore 119, to ensure that shaft 118 sealingly engages barrier 109 and fluid does not pass through bore 119.

Shaft 118 is coupled to a second piston 122 at a distal end thereof (e.g. at an opposed end to piston 116). Piston 122 sealingly engages a sidewall 124 of second barrel 104 to inhibit the passage of trailer hydraulic fluid between a fluid providing portion 120b of second chamber 120 and a fluid receiving portion 120a of second chamber 120. Fluid receiving portion 120a of second chamber 120 may not house a hydraulic fluid. Rather, fluid receiving portion 120a may house a compressible fluid (such as but not limited to air). Second barrel 104 includes a vent 126 adjacent barrier 109 that provides for passage of air between fluid receiving portion 120a of second chamber 120 and the environment.

In at least one embodiment, there is a difference between first barrel 114 and second barrel 120. In this embodiment, more volume of hydraulic fluid can be used to lift dump box 24 than leaves the vehicle.

To sealingly engage sidewall 124, second piston 122 may include one or more gaskets or seals 127. Gaskets or seals 127 may promote sealed sliding movement of piston 122 within second chamber 120.

Fluid providing portion 120b of second chamber 120 is typically filled with trailer hydraulic fluid prior (or vehicle hydraulic fluid) to hydraulically coupling vehicle 10 to dump trailer 20. In this manner, fluid providing portion 120b of second chamber 120 may be considered to store trailer hydraulic fluid when the dump trailer is not operating (i.e., lifting or lowering the dump body).

To lift the dump body 26 of dump trailer 20, an operator of vehicle 10 initiates injection of vehicle hydraulic fluid from vehicle 10 into fluid receiving portion 114a. For example, vehicle 10 may include a vehicle hydraulic fluid reservoir housing vehicle hydraulic fluid and a pump (not shown) and the operator may activate the pump to inject vehicle hydraulic fluid from vehicle 10 into fluid receiving portion 114a.

Figure 7:
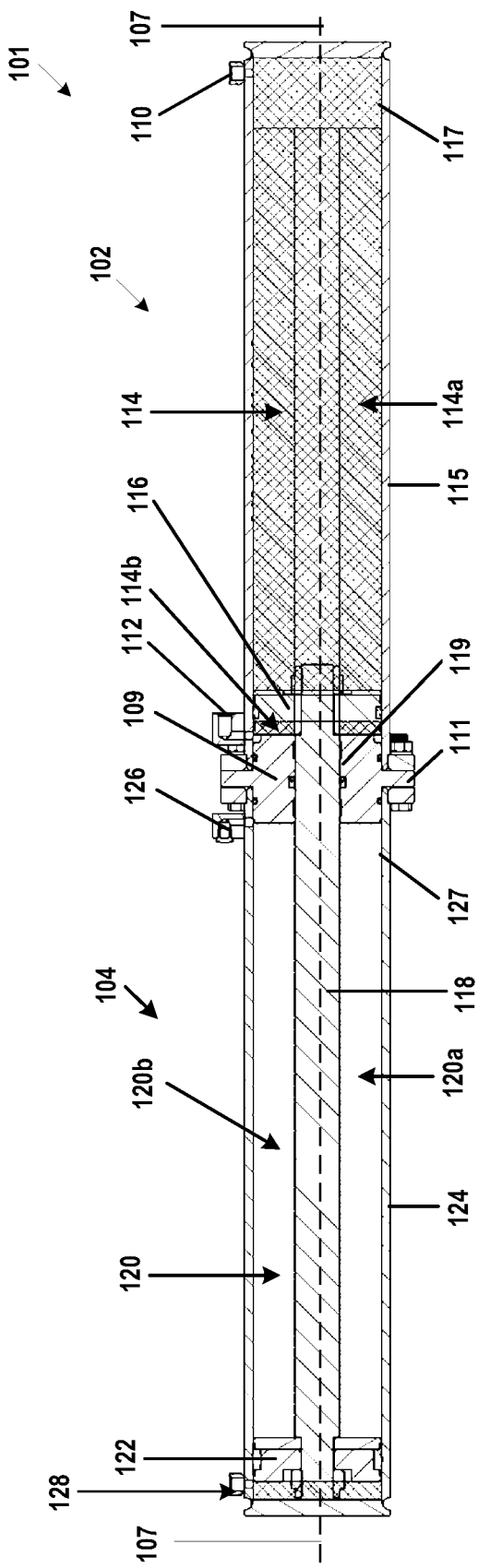
FIG. 7 is a cross-sectional view of the double barrel cylinder assembly shown in FIGS. 3 and 4 when the dump box is lifted.

FIG. 7 shows an example of the cylinder 101 when dump box 26 is lifted.

Upon fluid receiving portion 114a of first chamber 114 being filled with vehicle hydraulic fluid, piston 116 is driven to slidingly move within first chamber 114 to increase the volume of fluid receiving portion 114a. Correspondingly, second piston 112 is also driven to slidingly move within second chamber 120 to increase the volume of fluid receiving portion 120a and decrease the volume of fluid providing portion 120b. Decreasing the volume of fluid providing portion 120b results in trailer hydraulic being driven out of fluid providing portion 120b via outlet fluid port 128 and into lifting mechanism 26 to lift dump body 24.

To lower the dump body 26, the operator of vehicle 10 can initiate the movement of vehicle hydraulic fluid though outlet fluid port 112 and into the fluid providing portion 114b of the first chamber 114. Upon fluid providing portion 114b of first chamber 114 being filled with vehicle hydraulic fluid, piston 116 is driven to slidingly move in an opposite direction to which it moved to lift the dump body 26 within first chamber 114 to increase the volume of fluid providing portion 114a and, correspondingly, reduce the volume of fluid receiving portion 114a. As this occurs, second piston 112 is also driven to slidingly move within second chamber 120 in an opposite direction to which it moved to lift the dump body 26 to increase the volume of fluid providing portion 120b and decrease the volume of fluid receiving portion 120a. Increasing the volume of fluid providing portion 120b results in trailer hydraulic fluid being driven out of lifting mechanism 26 and into fluid providing portion 120b through outlet fluid port 128. As trailer hydraulic fluid is driven out of lifting mechanism 26, dump body 26 is lowered.

Figure 8:
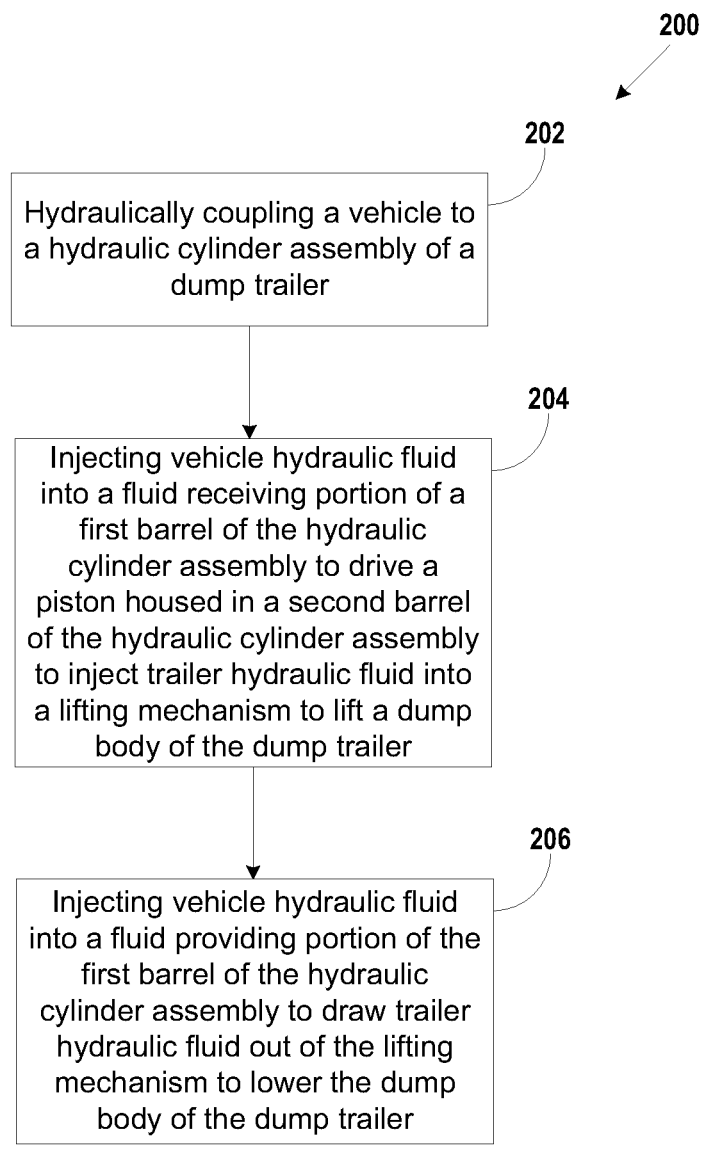
FIG. 8 is a block diagram of a method of operating a dump trailer, according to at least one embodiment described herein.

Turning to FIG. 8, illustrated therein is a method 200 of operating a dump trailer. At a first step 202, a vehicle is hydraulically coupled to the dump trailer, the dump trailer comprising a hydraulic cylinder assembly according to at least one embodiment described herein.

At a second step 204, vehicle hydraulic fluid is injected into a fluid receiving portion of a first barrel of the hydraulic cylinder assembly. Upon the vehicle hydraulic fluid being received in the fluid receiving portion of a first barrel of the hydraulic cylinder assembly, a piston of the hydraulic cylinder assembly drives trailer hydraulic fluid housed in a fluid providing portion of a second barrel of the hydraulic cylinder assembly into a lifting mechanism of the dump trailer to lift the dump body.

At a third step 206 of the method 200, vehicle hydraulic fluid is injected into a fluid providing portion of the first barrel of the hydraulic cylinder assembly. Upon the vehicle hydraulic fluid being received in the fluid providing portion of the first barrel of the hydraulic cylinder assembly, the piston of the hydraulic cylinder assembly moves in a direction opposite to the direction it travelled to drive the trailer hydraulic fluid into the lifting mechanism, thereby drawing the trailer hydraulic fluid out of the lifting mechanism and back into the fluid providing portion of the second barrel to lower the dump body.

The hydraulic cylinder assemblies and/or hydraulic dump trailers having the hydraulic cylinder assemblies described herein may offer advantages over present dump trailers either having hydraulic lift mechanisms hydraulically coupled to vehicle hydraulic systems or onboard hydraulic fluid systems (i.e. an onboard hydraulic reservoir and one or more hydraulic pumps). For example, the hydraulic cylinder assemblies and/or hydraulic dump trailers having the hydraulic cylinder assemblies described herein may provide for using hydraulic pumps present on vehicles hydraulically coupled thereto, which are traditionally bigger and therefore offer a greater load capacity than hydraulic pumps present on current dump trailers. The hydraulic cylinder assemblies and/or hydraulic dump trailers having the hydraulic cylinder assemblies described herein may also provide for use of vehicle hydraulic fluid and trailer hydraulic fluid for lifting the dump box, thereby reducing the volume of vehicle hydraulic fluid used relative to present systems that are directly coupled to vehicle hydraulic systems and reducing the volume of trailer hydraulic fluid need to be stored on the dump trailer relative to present dump trailers that have onboard hydraulic fluid systems.

In an optional step, before vehicle hydraulic fluid is injected into the fluid receiving portion of the first barrel of the hydraulic cylinder assembly, vehicle hydraulic fluid is injected into a fluid providing portion of the second barrel of the hydraulic cylinder assembly to fill the second barrel of the hydraulic cylinder assembly. A pressure relief valve of the hydraulic cylinder assembly may be used to direct the vehicle hydraulic fluid into the fluid providing portion of the second barrel. Once the fluid providing portion of the second barrel of the hydraulic cylinder assembly is filled, the pressure relief valve may be closed and the vehicle hydraulic fluid may be injected into the fluid receiving portion of the first barrel.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A hydraulic cylinder assembly for a dump trailer for use with a vehicle having a vehicle hydraulic fluid system, the hydraulic cylinder assembly comprising:
   a first barrel defining a first chamber therein;
   a second barrel rigidly coupled to the first barrel along a longitudinal axis of the hydraulic cylinder assembly, the second barrel defining a second chamber therein, the second chamber being separated from the first chamber by a barrier;
   the first barrel comprising:
      an inlet port remote from the barrier for receiving vehicle hydraulic fluid from the vehicle hydraulic fluid system into a fluid receiving portion of the first chamber; and an outlet port adjacent the barrier for providing the vehicle hydraulic fluid from a fluid providing portion of the first chamber to the vehicle hydraulic fluid system; and the second barrel comprising:
an inlet port adjacent the barrier; and
an outlet port remote from the barrier for providing dump trailer hydraulic fluid to a lifting mechanism of the dump trailer; and a piston assembly comprising:
a first piston housed in the first chamber, the first piston dividing the first chamber into the fluid receiving portion and the fluid providing portion; and
a second piston housed in the second chamber, the second piston being coupled to the first piston by a shaft, the second piston dividing the second chamber into the fluid receiving portion and the fluid providing portion, the shaft extending along the longitudinal axis through a bore in the barrier;
the piston assembly being configured to provide the dump trailer hydraulic fluid to the lifting mechanism to lift a dump box of the dump trailer when the fluid receiving portion of the first chamber receives the vehicle hydraulic fluid from the vehicle.

2. The hydraulic cylinder assembly of claim 1, wherein the vehicle and the first chamber of the hydraulic cylinder assembly form a vehicle hydraulic fluid circuit and the lifting mechanism and the second chamber of the hydraulic cylinder assembly form a trailer hydraulic fluid circuit.

3. The hydraulic cylinder assembly of claim 2, wherein the barrier inhibits the vehicle hydraulic fluid of the vehicle hydraulic fluid circuit from entering the trailer hydraulic fluid circuit.

4. The hydraulic cylinder assembly of claim 1, wherein the barrier includes a flange that extends radially outwardly relative to a sidewall of the first barrel and a sidewall of the second barrel.

5. The hydraulic cylinder assembly of claim 4, wherein the flange of the barrier extends radially outwardly relative to the sidewall of the first barrel and the sidewall of the second barrel between a first flange of the first barrel and a second flange of the second barrel.

6. The hydraulic cylinder assembly of claim 1, wherein the inlet port of the second barrel is configured to provide a compressible fluid into the fluid receiving portion of the second chamber when the fluid receiving portion of the first chamber receives the vehicle hydraulic fluid from the vehicle.

7. The hydraulic cylinder assembly of claim 1 further comprising a pressure relief valve configured to redirect vehicle hydraulic fluid to the lifting mechanism when a pressure within the first chamber exceeds a threshold pressure.

8. The hydraulic cylinder assembly of claim 1, wherein the first piston is configured to travel in a direction along the longitudinal axis of the hydraulic cylinder when the fluid receiving portion of the first chamber receives the vehicle hydraulic fluid from the vehicle.

9. The hydraulic cylinder assembly of claim 1, wherein the second piston is configured to travel in a direction along the longitudinal axis of the hydraulic cylinder when the fluid receiving portion of the first chamber receives the vehicle hydraulic fluid from the vehicle.

10. A dump trailer comprising:
a frame;
a dump box pivotally coupled to the frame;
a lifting mechanism coupled to each of the frame and the dump box, the lifting mechanism being configured to lift a portion of the dump box relative to the frame; and
a hydraulic cylinder assembly hydraulically coupled to the lifting mechanism and a vehicle hydraulic system, the hydraulic cylinder assembly comprising:
a first barrel defining a first chamber therein;
a second barrel rigidly coupled to the first barrel along a longitudinal axis of the hydraulic cylinder assembly, the second barrel defining a second chamber therein, the second chamber being separated from the first chamber by a barrier;
the first barrel comprising:
an inlet port remote from the barrier for receiving vehicle hydraulic fluid from the vehicle hydraulic fluid system into a fluid receiving portion of the first chamber; and
an outlet port adjacent the barrier for providing the vehicle hydraulic fluid from a fluid providing portion of the first chamber to the vehicle hydraulic fluid system; and
the second barrel comprising:
an inlet port adjacent the barrier; and
an outlet port remote from the barrier for providing dump trailer hydraulic fluid to the lifting mechanism of the dump trailer; and
a piston assembly comprising:
a first piston housed in the first chamber, the first piston dividing the first chamber into the fluid receiving portion and the fluid providing portion; and
a second piston housed in the second chamber, the second piston being coupled to the first piston by a shaft, the second piston dividing the second chamber into the fluid receiving portion and the fluid providing portion, the shaft extending along the longitudinal axis through a bore in the barrier;
the piston assembly being configured to provide the dump trailer hydraulic fluid to the lifting mechanism to lift a dump box of the dump trailer when the fluid receiving portion of the first chamber receives the vehicle hydraulic fluid from the vehicle.

11. The dump trailer of claim 10, wherein the hydraulic cylinder assembly includes a first hydraulic cylinder and a second hydraulic cylinder, each of the first hydraulic cylinder and the second hydraulic cylinder being hydraulically coupled to the vehicle hydraulic system.

12. The dump trailer of claim 11 further comprising a pressure relief valve hydraulically coupled to each of the first hydraulic cylinder and the second hydraulic cylinder, the pressure relief valve being configured to redirect the vehicle hydraulic fluid to the lifting mechanism when a pressure within a first chamber of the first hydraulic cylinder or a first chamber of the second hydraulic cylinder exceeds a threshold pressure.

13. The dump trailer of claim 10, wherein the vehicle and the first chamber of the hydraulic cylinder assembly form a vehicle hydraulic fluid circuit and the lifting mechanism and the second chamber of the hydraulic cylinder assembly form a trailer hydraulic fluid circuit.

14. The dump trailer of claim 13, wherein the barrier inhibits the vehicle hydraulic fluid of the vehicle hydraulic fluid circuit from entering the trailer hydraulic fluid circuit.

15. The dump trailer of claim 10, wherein the barrier includes a flange that extends radially outwardly relative to a sidewall of the first barrel and a sidewall of the second barrel.

16. The dump trailer of claim 15, wherein the flange of the barrier extends radially outwardly relative to the sidewall of the first barrel and the sidewall of the second barrel between a first flange of the first barrel and a second flange of the second barrel.

17. The dump trailer of claim 10, wherein the inlet port of the second barrel is configured to provide a compressible fluid into the fluid receiving portion of the second chamber when the fluid receiving portion of the first chamber receives the vehicle hydraulic fluid from the vehicle.

18. The dump trailer of claim 10, wherein the first piston is configured to travel in a direction along the longitudinal axis of the hydraulic cylinder when the fluid receiving portion of the first chamber receives the vehicle hydraulic fluid from the vehicle.

19. The dump trailer of claim 10, wherein the second piston is configured to travel in a direction along the longitudinal axis of the hydraulic cylinder when the fluid receiving portion of the first chamber receives the vehicle hydraulic fluid from the vehicle.

20. A method of operating a dump trailer, the method comprising:

hydraulically coupling a vehicle hydraulic system to a hydraulic cylinder assembly of the dump trailer, the hydraulic cylinder assembly being hydraulically coupled to a lifting mechanism of the dump trailer, the hydraulic cylinder assembly comprising at least one hydraulic cylinder, the at least one hydraulic cylinder comprising:

a first barrel defining a first chamber therein; and a second barrel rigidly coupled to the first barrel along a longitudinal axis of the hydraulic cylinder assembly, the second barrel defining a second chamber therein, the second chamber being separated from the first chamber by a barrier;

injecting vehicle hydraulic fluid from the vehicle hydraulic fluid system into a fluid receiving portion of the first chamber of the first barrel to drive a first piston housed in the first chamber and a second piston housed in the second chamber, the second piston being configured to inject trailer hydraulic fluid housed in the second barrel into the lifting mechanism to lift a dump body of the dump trailer; and injecting vehicle hydraulic fluid into a fluid providing portion of the first chamber of the first barrel of the hydraulic cylinder assembly to draw trailer hydraulic fluid out of the lifting mechanism and into the second barrel to lower the dump body of the dump trailer.

* * * * *